United States Patent [19]

Bartlett

[11] Patent Number: 4,597,895

[45] Date of Patent: Jul. 1, 1986

[54] AEROSOL CORROSION INHIBITORS

[75] Inventor: Philip L. Bartlett, Wilmington, Del.

[73] Assignee: E. I. Du Pont de Nemours and Company, Wilmington, Del.

[21] Appl. No.: 678,882

[22] Filed: Dec. 6, 1984

[51] Int. Cl.[4] ............................................. C09K 3/30
[52] U.S. Cl. ................................... 252/392; 252/394;
252/305; 424/126; 424/45; 424/46; 424/47;
424/68; 424/70; 424/76; 424/DIG. 1;
424/DIG. 2
[58] Field of Search ....................... 252/305, 392, 394;
424/45, 47, 126

[56] References Cited

U.S. PATENT DOCUMENTS

| | | | |
|---|---|---|---|
| 3,553,138 | 1/1971 | Mace | 252/305 X |
| 3,650,956 | 3/1972 | Strand et al. | 252/90 |
| 3,650,981 | 3/1972 | Inouye et al. | 252/305 X |
| 3,650,982 | 3/1972 | Flanner | 252/305 X |
| 4,439,342 | 3/1984 | Albanese | 252/305 |

FOREIGN PATENT DOCUMENTS 2028364  3/1980  United Kingdom ................ 252/305

OTHER PUBLICATIONS

"Research Disclosure" May 1983, p. 174, Item 22913.
Sanders, "Handbook of Aerosol Technology", 2nd Ed., Van Nostrand Reinhold Co., NY, NY (1979), p. 210.
Glessner, "Aerosol Age", vol. 9, p. 98 (Oct. 1964).

*Primary Examiner*—John F. Terapane
*Assistant Examiner*—Matthew A. Thexton

[57] ABSTRACT

Corrosion inhibitor compositions comprising a mixture of a nitroalkane containing 1-3 carbon atoms and a cocoamide of diethanolamine. Such compositions are useful in inhibiting corrosion on the interior surfaces of tin-plated aerosol cans containing water-based aerosol formulations.

6 Claims, No Drawings ized cans or lined steel cans, most formulations are loaded into unlined cans made of tin-plated steel. While the tin affords protection against corrosion, the thinness of the coating, imperfections in the surface, wear and tear, and chemical action may ultimately expose the steel to the contents of the can and corrosion can result. When aerosol formulations contain less than about 80 ppm (parts per million) water, corrosion of tin-plate cans is not generally a serious problem. However, if the water content of an aerosol formulation is more than 80 ppm, problems due to corrosion are more likely to occur.

AEROSOL CORROSION INHIBITORS

BACKGROUND OF THE INVENTION

1. Field of the Invention

This invention relates to corrosion inhibitor compositions which are useful in inhibiting corrosion in aerosol products.

2. Description of the Prior Art

Many products designed for household, personal, automotive and other types of use are available as aerosol products. Typical examples of such products include personal products such as hair care products (sprays, coloring agents and styling/conditioning mousses), deodorants, antiperspirants, first aid sprays, and colognes: household products such as waxes, polishes, pan sprays, insecticides and room fresheners; automotive products such as cleaners and polishes; industrial products such as cleaners, lubricants and mold release agents; and animal care products such as tick and flea repellents.

Although some aerosol products are packaged in glass bottles or aluminum cans or lined steel cans, most formulations are loaded into unlined cans made of tin-plated steel. While the tin affords protection against corrosion, the thinness of the coating, imperfections in the surface, wear and tear, and chemical action may ultimately expose the steel to the contents of the can and corrosion can result. When aerosol formulations contain less than about 80 ppm (parts per million) water, corrosion of tin-plate cans is not generally a serious problem. However, if the water content of an aerosol formulation is more than 80 ppm, problems due to corrosion are more likely to occur.

The introduction of dimethyl ether (DME) as an aerosol propellant has opened the way to the use of more water-based aerosol formulations and made possible the manufacture of products of lesser flammability and lower ingredient cost. However, the use of water in such aerosol formulations also increases the problem of corrosion on the interior of the tin-plated steel cans which are so widely used, thus leading to contamination of the aerosol product and ultimately to leaking of the can if corrosion is severe enough. For this reason, corrosion inhibitors are used with aerosol propellants containing DME, when this propellant is to be used in tin-plated steel cans containing a water-based formulation.

The matter of inhibiting corrosion in an aerosol can presents the dual problem of achieving corrosion inhibition in a system where there is both liquid and vapor phase contact with the metal. In a system that contains DME and water, corrosion of the can in areas in contact with the vapor phase is aggravated by the fact that relatively large amounts of water vapor are present along with the DME propellant in the vapor space above the liquid contents of the container. For example, the vapor phase of a 95/5 wt % dimethyl ether/water system contains 7,750 ppm water vapor at 70° F. (21.1° C.). Moreover, the addition of ethanol to a DME/water system will often exacerbate the problem of vapor phase corrosion. A 90/5/5 (wt %) DME/ethanol/water system will contain 9,100 ppm water vapor at 70° F.

SUMMARY OF THE INVENTION

Many commercially available corrosion inhibitors are either ineffective for aerosol systems containing DME or they fail to provide adequate protection against both liquid phase and vapor phase corrosion. It often happens that a corrosion inhibitor gives good protection where the liquid phase is in contact with the can but fails to provide protection in areas where the interior surfaces of the can are in contact with vapor during storage. The reverse can also occur where the inhibitor gives good protection on the interior where there is contact with vapor, but poor protection where liquid normally contacts the container. The present invention provides an improvement in aerosol compositions containing an aqueous aerosol-dispersible media and a propellant gas in which the improvement comprises the presence of a corrosion inhibitor in the aerosol composition in a minor amount sufficient to provide corrosion inhibition to the composition. The corrosion inhibitor which constitutes the improvement in the aerosol composition is effective against both vapor phase and liquid phase corrosion, and it is comprised of about 15 to 85 wt % of a nitroalkane containing 1–3 carbon atoms and 85 to 15 wt % of a cocoamide of diethanolamine wherein the mole ratio of diethanolamine to coconut fatty acid is about 1:1 to 2:1. Such corrosion inhibitors are useful in a wide variety of aerosol compositions where there is a need to protect the container from corrosive attack. As a general rule, this includes aerosol compositions in which the formulation is water-based. Because of the compatiblity of DME with water, it is common in the aerosol industry to use DME as the propellant gas either alone or in combination with other well known aerosol propellants. Propellants such as chlorodifluoromethane (FC-22), 1-chloro-1,1-difluoroethane (FC-142b), 1,1-difluoroethane (FC-152a), hydrocarbons such as butane, isobutane and propane and compressed gases such as $CO_2$ and nitrogen and mixtures of these propellants can be used in water-based aerosol formulations with or without DME. The corrosion inhibitor compositions of this invention can be used in aerosols containing any of these propellants or combinations thereof. The introduction of the inhibitor into the propellant prior to loading into the aerosol can is a convenient way to incorporate the inhibitor into the final aerosol formulation, and therefore, one of the objects of the invention is to provide aerosol propellant compositions containing one or more propellants, such as those described above, in combination with the corrosion inhibitor in an amount sufficient to provide corrosion inhibition in water-based aerosols.

The effectiveness of the two components of the corrosion inhibitor compositions of the invention is not additive or supplementary but is greater than expected or predicted from the performance of the individual ingredients. Thus, neither the nitroalkanes nor the cocoamides of di-ethanolamine performed satisfactorily as corrosion inhibitors in the liquid or the vapor phase of the aerosol formulations evaluated. Hence, it is clear that the corrosion inhibitor compositions of the invention are not simply blends of liquid phase and vapor phase inhibitors.

DETAILED DESCRIPTION

The nitroalkanes used in the corrosion inhibitor composition of the invention are commercially available materials. Nitromethane is the preferred nitroalkane, but other nitroalkanes such as nitroethane and 1-nitropropane can also be used. Cocoamides of diethanolamine are also commercially available products. These materials are prepared by reacting diethanolamine with fatty acids derived from coconut oil in a mol ratio of one or two moles of diethanolamine to one mole of coconut fatty acids. The preferred mole ratio for the compositions of this invention is 1:1. In a typical method of preparing the cocoamides, a mixture of diethanolamine and fatty acids in a 1/1 or 2/1 mole ratio is combined and heated to 150°-170° C. with agitation and the application of a gentle nitrogen sweep until the appropriate quantity of water is collected (1 mole water is produced for each mole of fatty acid used). If desired, a solvent such as xylene can be employed, and the water can be removed by codistillation along with xylene.

The proportion of the two constituents that form the inhibitor composition can be in the range of 15 to 85 wt % nitroalkane and 85 to 15 wt % cocoamide of diethanolamine. A preferred range is 40 to 60 wt % nitroalkane and 60 to 40 wt % cocoamide of diethanolamine. A 50/50 mixture by weight is a preferred composition, and nitromethane is the preferred nitroalkane. The optimum concentration of inhibitor composition needed to obtain effective corrosion inhibition will, of course, vary with the formulation in which it is to be used, and it can be determined by storage tests, such as those described in the Examples. Generally, the effective concentration range is 0.2 to 2 wt % based on the total weight of the aerosol formulation including the weight of a propellant as well as the weight of the other ingredients. A preferred weight range is 0.2 to 0.5 wt % of the aerosol formulation. The inhibitors can be added directly to the aerosol can either alone or mixed with other non-pressurized ingredients, or if preferred, they can be introduced as solutions in the propellant in an amount which when incorporated with the other ingredients will provide the desired 0.2 to 2 wt % of corrosion inhibitor in the final composition.

The composition of the aqueous aerosol-dispersible media which is, in essence, the formulation containing the active ingredients, will, quite naturally, depend upon the use for which the aerosol is designed. Such formulations are well known to persons skilled in the art, and the choice of formulation is not critical to the use of the invention as long as the media is not too highly acidic or too basic. As a general rule the pH of the contents of the can should be between about 4.5 and about 10. Also, the use of the corrosion inhibitors in tin-plated cans with dry-type antiperspirants containing aluminum chlorohydrate is not recommended. Lined cans should be used in these instances.

EXAMPLES

Sixty-day corrosion tests at 120° F. (48.9° C.) were run on the corrosion inhibitors in five aerosol formulations. These formulations were selected as being representative of commerical products, in their chemical compositions. Distilled water was used in each of the five formulations because it was readily available in the laboratory. However, similar results would be expected with deionized water which is often used in commercial aerosols.

| Component | Wt. % |
|---|---|
| Formulation No. 1 | |
| Room Freshener (pH = 6) | |
| Rose fragrance | 1.40 |
| Ethanol (SDA 40-1) | 19.60 |
| Water (distilled) | 49.00 |
| Dimethyl ether | 30.00 |
| Formulation No. 2 | |
| Insecticide (pH = 6) | |
| Natural pyrethrins | 1.50 |
| Piperonyl butoxide | 0.65 |
| Polyglyceryl fatty acid ester surfactant (Witco Chemical Corp.) | 0.97 |
| Ethanol (SDA 40-1) | 10.01 |
| Water (distilled) | 51.87 |
| Dimethyl ether | 35.00 |
| Formulation No. 3 | |
| Hairspray (pH = 7.2) | |
| Vinyl acetate/crotonic acid/vinyl neodecanoate terpolymer | 2.50 |
| 2-amino-2-methyl-1-propanol | 0.20 |
| Modified lauric alkanolamide | 0.10 |
| Silicone glycol copolymer | 0.05 |
| Ethanol (SDA 40-1) | 37.15 |
| Water (distilled) | 10.00 |
| Chlorodifluoromethane (FC-22) | 20.00 |
| Dimethyl ether | 30.00 |
| Formulation No. 4 | |
| Hairspray (pH = 7.2) | |
| Vinyl acetate/crotonic acid/vinyl neodecanoate terpolymer | 2.50 |
| 2-amino-2-methyl-1-propanol | 0.20 |
| Modified lauric alkanolamide | 0.10 |
| Silicone glycol copolymer | 0.05 |
| Ethanol (SDA 40-1) | 52.15 |
| Water (Distilled) | 10.00 |
| Dimethyl ether | 35.00 |
| Formulation No. 5 | |
| Insecticide (pH = 5) | |
| Phosphorothioic acid O, O—diethyl O—(3,5,6-trichloro-2-pyridyl) ester | 0.98 |
| Natural pyrethrins | 0.06 |
| Piperonyl butoxide | 0.13 |
| Polyglyceryl fatty acid ester surfactant | 0.20 |
| Water (distilled) | 63.63 |
| Dimethyl ether | 35.00 |

PROCEDURE

All of the examples were prepared using the following procedure. The active ingredients were weighed individually into an eight-ounce three-piece aerosol can 2⅛" in diameter and 5-9/16" long, except when the corrosion inhibitors were added to the aerosol can as a solution in the propellant (noted in tables). The can was purged with dichlorodifluoromethane (FC-12) vapor to displace the air in the container. The aerosol can valve was then placed into the can and crimped. The propellants were introduced into the can as liquids through the aerosol valve. Volume amounts corresponding to the weights of the propellants were calculated prior to loading, and a glass, calibrated, pressure buret was used to measure and transfer the liquids from storage cylinders to the can. A nitrogen gas pressure of 100 psig was applied to the buret to aid in transferring the liquids from the buret to the can. After the propellant was loaded, the can was weighed, and the weight of propellant recorded.

The aerosol cans used in the corrosion tests were commercially available containers and are described in trade literature as: one inch round dome top unlined aerosol containers, size 202×509 (2⅛" diameter, 5-9/16" can wall height), 0.25 lb electrolytic tin-plated (ETT), full concave bottom with welded side seam.

A corrosion test rating system was used which provides a complete visual description of the appearance of the interior surface of the tin-plated steel aerosol cans after 60 days storage at 120° F.

| CAN CORROSION - RATING SYSTEM | |
|---|---|
| Rating* | Description |
| 0 | No Corrosion |
| 1 | Trace Corrosion |
| 2 | Light Corrosion |
| 3 | Moderate Corrosion |
| 4 | Heavy Corrosion |
| 5 | Severe Corrosion |

*This numerical rating is an overall assessment of the total can (tin-plate, joints and side seams) and represents the primary rating of a test. A rating of 0–2 is considered effective and 3 or greater is a failed rating.

CORROSION INHIBITORS USED IN TESTS

| Material | Designation and Source |
|---|---|
| Diethanolamide of Coconut fatty acids (2:1 mol ratio) | Clindrol LT 14-69 (Clintwood Chemical Co.), Chicago, IL |
| Diethanolamide of Coconut fatty acids (1:1 mol ratio) | Seachem SC-200 (Seaquist Division of Pittway Corp.), Cary, IL |
| Nitromethane | Angus Chemical Co., Northbrook, IL |
| Nitroethane | Aldrich Chemical Co., Milwaukee, WI |
| 1-Nitropropane | Aldrich Chemical Co., Milwaukee, WI |

TABLE #1

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 days at 120° F. | Formulation #1 | 5 | Brown/red residue on walls; pitting on valve cup; detinning in vapor phase and on can bottom |
| Diethanolamide of Coconut fatty acids (2:1 mol ratio) | 0.50 | 60 days at 120° F. | Formulation #1 | 5 | Pitting and rusting on valve cups; liquid discolored |
| Diethanolamide of Coconut fatty acids (1:1 mol ratio) | 0.50 | 60 days at 120° F. | Formulation #1 | 5 | Black residue in can; detinning in liquid phase; valve pitting |
| Nitromethane | 0.50 | 60 days at 120° F. | Formulation #1 | 5 | Severe liquid phase rusting/ detinning; valve pitting |
| Diethanolamide of Coconut fatty acids (2:1 mol ratio) | 0.25 | 60 days at 120° F. | Formulation #1 | 0 | No corrosion |
| Nitromethane | 0.25 | 60 days at 120° F. | Formulation #1 | 0 | |
| Diethanolamide of Coconut fatty acids (1:1 mol ratio) | 0.25 | 60 days at 120° F. | Formulation #1 | 0 | No corrosion |
| Nitromethane | 0.25 | | | | |

TABLE #2

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #2 | 5 | Severe detinning in liquid and vapor zones; considerable corrosion in both phases |
| Diethanolamide of Coconut fatty acids (1:1 mol ratio) | 0.50 | 60 Days at 120° F. | Formulation #2 | 4 | Detinning of dome; side seam rusting; rusting at bottom joint |
| Nitromethane | 0.50 | 60 Days at 120° F. | Formulation #2 | 3 | Detinning and corrosion in liquid; vapor phase rusting |
| Diethanolamide of Coconut fatty acids (1:1 mol ratio) | 0.10 | 60 Days at 120° F. | Formulation #2 | 2 | Light corrosion at side seam |
| Nitromethane | 0.10 | | | | |
| Diethanolamide of Coconut fatty acids (1:1 mol ratio) | 0.10ª | 60 Days at 120° F. | Formulation #2 | 1 | Trace corrosion at side seam |
| Nitromethane | 0.10 | | | | |
| Diethanolamide of Coconut fatty acids | 0.25 | 60 Days at 120° F. | Formulation #2 | 1 | Trace corrosion at side seam |

TABLE #2-continued

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| (1:1 mol ratio) | | | | | |
| Nitromethane | 0.25 | | | | |
| Diethanolamide of Coconut fatty acids (1:1 mol ratio) | 0.25[a] | 60 Days at 120° F. | Formulation #2 | 1 | Trace corrosion at side seam |
| Nitromethane | 0.25 | | | | |
| Diethanolamide of Coconut fatty acids (1:1 mol ratio) | 0.50 | 60 Days at 120° F. | Formulation #2 | 0 | No corrosion |
| Nitromethane | 0.50 | | | | |
| Diethanolamide of Coconut fatty acids (1:1 mol ratio) | 0.50[a] | 60 Days at 120° F. | Formulation #2 | 0 | No corrosion |
| Nitromethane | 0.50 | | | | |
| Diethanolamide of Coconut fatty acids (1:1 mol ratio) | 1.00 | 60 Days at 120° F. | Formulation #2 | 0 | No corrosion |
| Nitromethane | 1.00 | | | | |
| Diethanolamide of Coconut fatty acids (1:1 mol ratio) | 0.10 | 60 Days at 120° F. | Formulation #2 | 0 | No corrosion |
| Nitromethane | 0.50 | | | | |
| Diethanolamide of Coconut fatty acids (1:1 mol ratio) | 0.25 | 60 Days at 120° F. | Formulation #2 | 0 | No corrosion |
| Nitromethane | 0.50 | | | | |
| Diethanolamide of Coconut fatty acids (1:1 mol ratio) | 0.50 | 60 Days at 120° F. | Formulation #2 | 0 | No corrosion |
| Nitromethane | 0.10 | | | | |
| Diethanolamide of Coconut fatty acids (1:1 mol ratio) | 0.50[a] | 60 Days at 120° F. | Formulation #2 | 0 | No corrosion |
| Nitromethane | 0.10 | | | | |
| Diethanolamide of Coconut fatty acids (1:1 mol ratio) | 0.50 | 60 Days at 120° F. | Formulation #2 | 0 | No corrosion |
| Nitromethane | 0.25 | | | | |

[a]Corrosion inhibitors were dissolved in propellant and added to can as propellant solution. Other samples were made by adding individual components in formulation to aersol can.

TABLE #3

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #2 | 5 | Severe detinning in liquid and vapor. Considerable rusting in both phases |
| Diethanolamide of Coconut fatty acids (2:1 mol ratio) | 0.50 | 60 Days at 120° F. | Formulation #2 | 3 | Detinning of dome; moderate corrosion in liquid and vapor phases |
| Nitromethane | 0.50 | 60 Days at 120° F. | Formulation #2 | 3 | Detinning and corrosion in liquid; vapor phase corrosion |
| Diethanolamide of Coconut fatty acids (2:1 mol ratio) | 0.10 | 60 Days at 120° F. | Formulation #2 | 1 | Trace corrosion at side seam and bottom joint |
| Nitromethane | 0.10 | | | | |
| Diethanolamide of Coconut fatty acids (2:1 mol ratio) | 0.10[a] | 60 Days at 120° F. | Formulation #2 | 1 | Trace corrosion at side seam and bottom joint |
| Nitromethane | 0.10 | | | | |
| Diethanolamide of Coconut Fatty Acids (2:1 mol ratio) | 0.25 | 60 Days at 120° F. | Formulation #2 | 0 | No corrosion |
| Nitromethane | 0.25 | | | | |
| Diethanolamide of Coconut Fatty Acids (2:1 mol ratio) | 0.25[a] | 60 Days at 120° F. | Formulation #2 | 0 | No corrosion |
| Nitromethane | 0.25 | | | | |

TABLE #3-continued

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| Diethanolamide of Coconut Fatty Acids (2:1 mol ratio) | 0.50 | 60 Days at 120° F. | Formulation #2 | 0 | No corrosion |
| Nitromethane | 0.50 | | | | |
| Diethanolamide of Coconut Fatty Acids (2:1 mol ratio) | 0.50[a] | 60 Days at 120° F. | Formulation #2 | 0 | No corrosion |
| Nitromethane | 0.50 | | | | |
| Diethanolamide of Coconut Fatty Acids (2:1 mol ratio) | 1.00 | 60 Days at 120° F. | Formulation #2 | 0 | No corrosion |
| Nitromethane | 1.00 | | | | |
| Diethanolamide of Coconut Fatty Acids (2:1 mol ratio) | 0.10 | 60 Days at 120° F. | Formulation #2 | 0 | No corrosion |
| Nitromethane | 0.50 | | | | |
| Diethanolamide of Coconut Fatty Acids (2:1 mol ratio) | 0.25 | 60 Days at 120° F. | Formulation #2 | 0 | No corrosion |
| Nitromethane | 0.50 | | | | |
| Diethanolamide of Coconut Fatty Acids (2:1 mol ratio) | 0.50 | 60 Days at 120° F. | Formulation #2 | 0 | No corrosion |
| Nitromethane | 0.10 | | | | |
| Diethanolamide of Coconut Fatty Acids (2:1 mol ratio) | 0.50[a] | 60 Days at 120° F. | Formulation #2 | 0 | No corrosion |
| Nitromethane | 0.10 | | | | |
| Diethanolamide of Coconut Fatty Acids 2:1 mol ratio) | 0.50 | 60 Days at 120° F. | Formulation #2 | 0 | No corrosion |
| Nitromethane | 0.25 | | | | |

[a]Corrosion inhibitors were dissolved in propellant and added to can as propellant solution. Other samples were made by adding individual components in formulation to aerosol can.

TABLE #4

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #3 | 5 | Severe liquid phase detinning; spots of rusting and detinning in vapor phase |
| Diethanolamide of Coconut fatty acids (1:1 mol ratio) | 0.50 | 60 Days at 120° F. | Formulation #3 | 4 | Severe liquid phase detinning; spots of rust in liquid phase |
| Nitromethane | 0.50 | 60 Days at 120° F. | Formulation #3 | 5 | Severe liquid phase detinning; large rust spots in both phases |
| Diethanolamide of Coconut fatty acids (1:1 mol ratio) | 0.25 | 60 Days at 120° F. | Formulation #3 | 2 | Light detinning in liquid phase |
| Nitromethane | 0.25 | | | | |
| Diethanolamide of Coconut fatty acids (1:1 mol ratio) | 0.50 | 60 Days at 120° F. | Formulation #3 | 1 | Trace detinning in liquid phase |
| Nitromethane | 0.50 | | | | |

TABLE #5

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #4 | 4 | Heavy vapor phase rusting |
| Diethanolamide of Coconut fatty acids (2:1 mol ratio) | 0.50 | 60 Days at 120° F. | Formulation #4 | 3 | Moderate vapor phase rusting |

TABLE #5-continued

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| Nitromethane | 0.50 | 60 Days at 120° F. | Formulation #4 | 3 | Moderate vapor phase rusting |
| Diethanolamide of Coconut fatty acids (2:1 mol ratio) | 0.25 | 60 Days at 120° F. | Formulation #4 | 1 | Trace vapor phase rusting |
| Nitromethane | 0.25 | | | | |
| Diethanolamide of Coconut fatty acids (2:1 mol ratio) | 0.50 | 60 Days at 120° F. | Formulation #4 | 1 | Trace vapor phase rusting |
| Nitromethane | 0.50 | | | | |

TABLE #6

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #4 | 4 | Heavy vapor phase rusting |
| Diethanolamide of Coconut fatty acids (1:1 mol ratio) | 0.50 | 60 Days at 120° F. | Formulation #4 | 3 | Moderate vapor phase rusting. |
| Nitromethane | 0.50 | 60 Days at 120° F. | Formulation #4 | 3 | Moderate vapor phase rusting |
| Diethanolamide of Coconut fatty acids (1:1 mol ratio) | 0.25 | 60 Days at 120° F. | Formulation #4 | 1 | Trace vapor phase rusting |
| Nitromethane | 0.25 | | | | |
| Diethanolamide of Coconut fatty acids (1:1 mol ratio) | 0.50 | 60 Days at 120° F. | Formulation #4 | 1 | Trace vapor phase rusting |
| Nitromethane | 0.50 | | | | |
| Diethanolamide of Coconut fatty acids (1:1 mol ratio) | 0.50[a] | 60 Days at 120° F. | Formulation #4 | 1 | Trace vapor phase rusting |
| Nitromethane | 0.50 | | | | |

[a]Corrosion inhibitors were dissolved in propellant and added to aerosol can as propellant solution. Other samples were made by adding individual components in formulation to aerosol can.

TABLE #7

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #5 | 5 | Severe corrosion in liquid and vapor phases. |
| Diethanolamide of Coconut fatty acids (1:1 mol ratio) | 0.50 | 60 Days at 120° F. | Formulation #5 | 5 | Severe corrosion in liquid and vapor phases. |
| Diethanolamide of Coconut fatty acids (2:1 mol ratio) | 0.50 | 60 Days at 120° F. | Formulation #5 | 4 | Heavy corrosion in liquid and vapor phases. |
| Nitromethane | 0.50 | 60 Days at 120° F. | Formulation #5 | 5 | Severe corrosion in liquid and vapor phases. |
| Diethanolamide of Coconut fatty acids (1:1 mol ratio) | 0.25 | 60 Days at 120° F. | Formulation #5 | 2 | Light vapor phase corrosion. |
| Nitromethane | 0.25 | | | | |
| Diethanolamide of Coconut fatty acids (1:1 mol ratio) | 0.50 | 60 Days at 120° F. | Formulation #5 | 2 | Light vapor phase corrosion. |
| Nitromethane | 0.50 | | | | |
| Diethanolamide of Coconut fatty acids (2:1 mol ratio) | 0.25 | 60 Days at 120° F. | Formulation #5 | 1 | Slight vapor phase corrosion |
| Nitromethane | 0.25 | | | | |
| Diethanolamide of Coconut fatty acids (2:1 mol ratio) | 0.50 | 60 Days at 120° F. | Formulation #5 | 1 | Slight vapor phase corrosion |
| Nitromethane | 0.50 | | | | |

TABLE #8

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 Days at 120° F. | Formulation #2 | 5 | Severe detinning in liquid and vapor zones; considerable corrosion in both phases. |
| Nitroethane | 0.50 | 60 Days at 120° F. | Formulation #2 | 3 | Some detinning in liquid phase. Rust spots in liquid and vapor phases. |
| 1-Nitropropane | 0.50 | 60 Days at 120° F. | Formulation #2 | 3 | Some detinning in liquid phase. Rust spots in liquid and vapor phases. |
| Diethanolamide of Coconut fatty acids (1:1 mol ratio) Nitroethane | 0.25  0.25 | 60 Days at 120° F. | Formulation #2 | 1 | Trace detinning in vapor phase |
| Diethanolamide of Coconut fatty acids (1:1 mol ratio) 1-Nitropropane | 0.25  0.25 | 60 Days at 120° F. | Formulation #2 | 1 | Trace detinning in vapor phase |

I claim:

1. In an aerosol composition containing an aqueous aerosol-dispersible media and a propellant, the improvement which comprises the presence of a corrosion inhibiting composition comprising 15 wt. % to 85 wt. % of nitroalkane containing 1-3 carbon atoms and 85 wt. % to 15 wt. % of cocoamide of diethanolamine wherein the mole ratio of the diethanolamine to coconut fatty acid is 1:1 to 2:1, said corrosion inhibiting composition being present in an amount sufficient to prevent more than light corrosion of a tin-plated steel aerosol can containing said aerosol composition.

2. The composition of claim 1 in which the nitroalkane is nitromethane and the mole ratio of diethanolamine to coconut fatty acid in the cocoamide is 1:1.

3. The composition of claim 1 in which the nitroalkane is nitromethane and the mole ratio of diethanolamine to coconut fatty acid in the cocoamide is 2:1.

4. The composition of claim 1 comprising 40 wt. % to 60 wt. % nitroalkane and 60 wt. % to 40 wt. % cocoamide of diethanolamine.

5. The composition of claim 4 in which the nitroalkane is nitromethane.

6. In an aerosol propellant for use in a water-based aerosol composition, the improvement which comprises the presence of a corrosion inhibitor composition comprising 15 wt. % to 85 wt. % of nitroalkane containing 1-3 carbon atoms and 85 wt. % to 15 wt. % of cocoamide of diethanolamine wherein the mole ratio of the diethanolamine to coconut fatty acid is 1:1 to 2:1, said corrosion inhibiting composition being present in an amount sufficient to prevent more than light corrosion of a tin-plated steel aerosol can containing said aerosol composition.

* * * * *